United States Patent
Ricciardi, Sr. et al.

(10) Patent No.: US 7,191,919 B2
(45) Date of Patent: Mar. 20, 2007

(54) WEIGHT-LOSS WEIGH FEEDER WITH PRESSURE COMPENSATION

(75) Inventors: Ronald J. Ricciardi, Sr., Woodcliff Lake, NJ (US); Marc S. Landry, Vernon, NJ (US)

(73) Assignee: Acrison, Inc., Moonachie, NJ (US)

( * ) Notice: Subject to any disclaimer, the term of this patent is extended or adjusted under 35 U.S.C. 154(b) by 125 days.

(21) Appl. No.: 10/931,556

(22) Filed: Sep. 1, 2004

(65) Prior Publication Data

US 2006/0043104 A1 Mar. 2, 2006

(51) Int. Cl.
*B67D 5/08* (2006.01)
*G01G 17/04* (2006.01)

(52) U.S. Cl. .............................. 222/53; 222/58; 222/77

(58) Field of Classification Search .................. 222/53, 222/58, 77, 152
See application file for complete search history.

(56) References Cited

U.S. PATENT DOCUMENTS

| 4,494,678 | A | | 1/1985 | Klein |
| 4,579,252 | A | | 4/1986 | Wilson et al. |
| 4,702,393 | A | | 10/1987 | Chen |
| 4,867,343 | A | | 9/1989 | Ricciardi et al. |
| 5,670,751 | A | * | 9/1997 | Hafner ........................... 177/1 |
| 6,161,723 | A | | 12/2000 | Cline et al. |
| 6,168,305 | B1 | * | 1/2001 | Marmsater .................. 700/240 |
| 2004/0002789 | A1 | * | 1/2004 | Hachtel ....................... 700/241 |

* cited by examiner

*Primary Examiner*—Joseph A. Kaufman
(74) *Attorney, Agent, or Firm*—Fish & Richardson P.C.

(57) ABSTRACT

A system is disclosed that minimizes the effect of internal pressure upon weight-loss weighing systems. The system can include a flexible gas purge line that pressurizes the system as well as a pressure compensator that negates the adverse effects of internal pressure on weight sensing equipment during normal operation.

9 Claims, 2 Drawing Sheets

— STATIC FORCES (NOT SHOWN FOR CLARITY)

⊕ — POSITIVE FORCES (AS SENSED BY WEIGHING SYSTEM)

⊖ — NEGATIVE FORCES (AS SENSED BY WEIGHING SYSTEM)

WEIGHT-LOSS WEIGH FEEDER WITH PRESSURE COMPENSATION

TECHNICAL FIELD

This disclosure relates to a weight-loss weigh feeder using pressure compensation.

BACKGROUND

Weight-loss weigh feeders are used to meter dry and liquid ingredients, at specific feed rates, either on a continuous or batch basis, into a wide range of processes. In many applications, weight-loss weigh feeders can be used to proportion various ingredients that comprise a particular formulation (e.g, foods, plastics, chemicals, pharmaceuticals, etc.).

Generally, weight-loss weigh feeders include a vessel (e.g., a hopper or tank appropriately designed and sized for specific ingredients and/or applications) mounted onto a weighing system (e.g., a scale) where product discharge is regulated based on a desired discharge or feed rate (i.e., weight output vs. time).

Typically, product is discharged out of the vessel by applying a metering device. The loss of weight, as sensed by the weighing system, can be transmitted to the feeder's controller and calculated into a feed rate (e.g., pounds or tons per minute or hour). The controller then can compare the calculated rate of discharge to a desired (set) discharge rate and simultaneously modulate the output of the weigh feeder's metering device to maintain the desired (set) rate.

Weight-loss weigh feeders require the weigh vessel be periodically refilled with product. In some applications, the weight-loss weigh feeder also may need to operate under the presence of dry air, or a gas purge (e.g., nitrogen, helium, argon) to prevent the material being handled from being exposed to potentially adverse reactants, such as ambient air. Generally, these applications require internal areas of the weight-loss weigh feeder to operate in the presence of some pressurized inert gas that forces out ambient air from within the feeder, and/or precludes ambient air from entering the feeder. The introduction of internal pressure in the vessel (whether constant or fluctuating), however, can create forces upon the weighing system that adversely affect accurate performance during normal operation.

SUMMARY OF THE DISCLOSURE

A system is disclosed that minimizes the effect of internal pressure upon weight-loss weighing systems. The system can include a gas inlet flexibly connected to a container and a pressure compensator that negates the adverse effects of internal pressurization (positive or negative) upon the weighing system during normal operation.

For example, according to one aspect, a system includes a container attached to a scale, the container having at least one material inlet for adding a material supply (product) and at least one flexible gas impermeable connector connected to the container that is capable of pressurizing the container, and a metering mechanism for removing material supply from the container.

In some implementations, the system also can include a pressure compensator attached to the container. The pressure compensator is configured to affect the adverse effects upon weight sensing when either a pressurized gas enters the container or a vacuum condition exists in the container.

In another aspect, a method includes providing a material supply or product into a container through at least one material inlet, the at least one material inlet providing a path or passage for the material supply or product entering the container. The method may either pressurize or depressurize the container by passing gas through a flexible gas inlet having a gas-impermeable flexible conduit and allowing the gas to contact a pressure compensator, the pressure compensator reducing an unequal pressurized force in the container, and metering at least a portion of the material supply from the container.

According to another aspect, a method includes providing material into a container, the container having a material inlet to provide a path for the material to enter the container and a gas inlet having a gas-impermeable flexible conduit for gas to enter the container. The method includes weighing the material in the container which has attached to it a pressure compensator that has an annular ring for minimizing unequal pressurized force in the container.

In some implementations, one or more of the following advantages can be present. For example, the pressure compensator can minimize or eliminate the adverse effects of internal pressure (positive or negative) from affecting accurate weight sensing. This may be particularly advantageous in optimizing system performance and cost effectiveness.

Another benefit may relate to container venting. Container venting may be accomplished by using a vent valve which opens and closes.

A further benefit may relate to sizing of the system components. The components of the pressure compensator would be sized as needed so that internal pressure in the container is equalized, thereby leaving the system to operate in a normal fashion.

An additional benefit may relate to the system's flexible gas line. The flexible gas line delivers purge gas to the interior of the container and has no positive or negative influence on the scale. The system also utilizes flexible sleeve material that allows free scale movement, but is gas impermeable so the purge gas can be contained in the container and not escape into the surrounding environment.

Additional features and advantages will be readily apparent from the following detailed description, the accompanying drawings and the claims.

BRIEF DESCRIPTION OF THE DRAWINGS

Like reference symbols in the various drawings indicate like elements.

DETAILED DESCRIPTION

Figure 1:
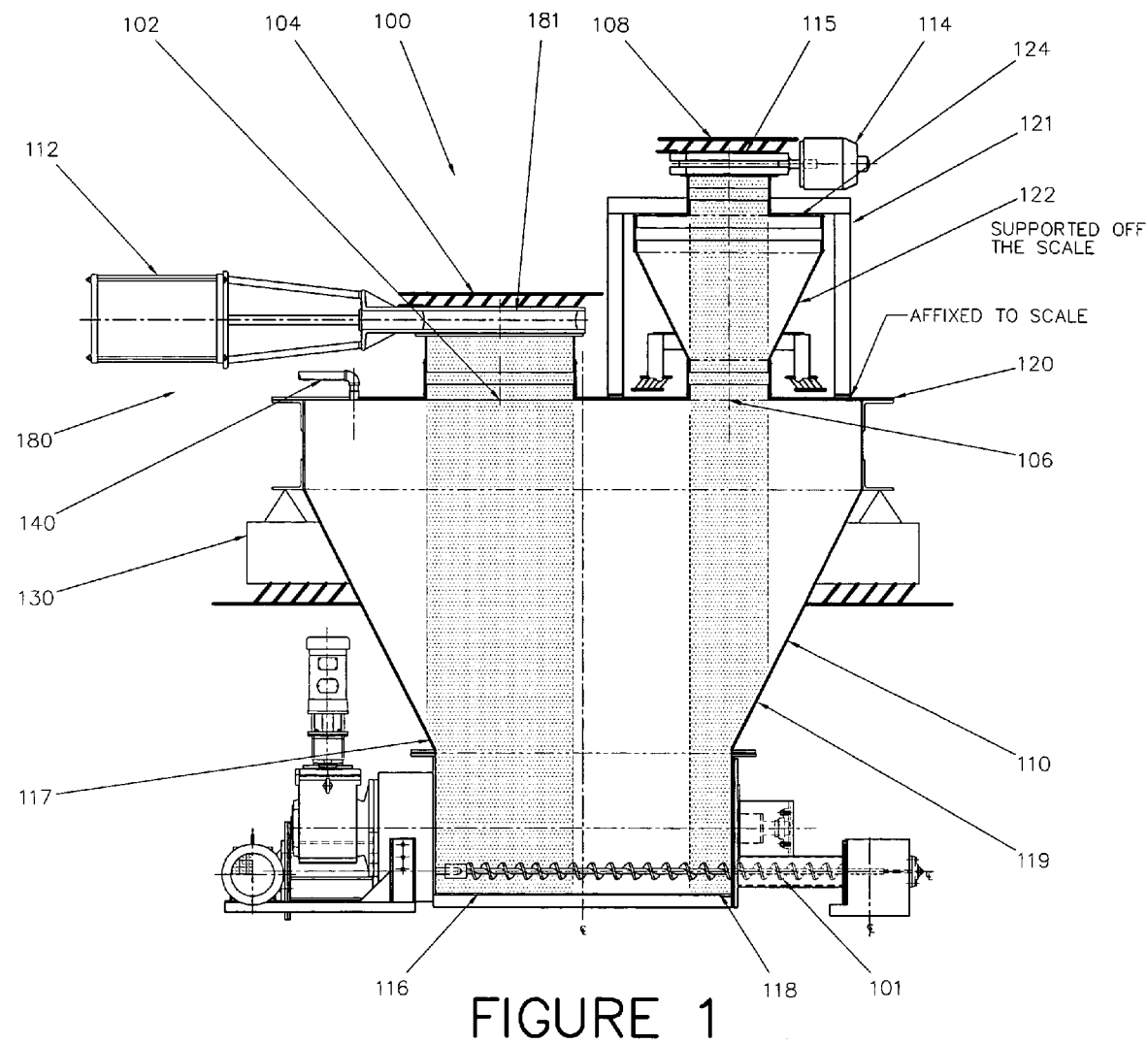
FIG. 1 illustrates an example of a weight-loss weigh feeder system with pressure compensation.

FIG. 1 discloses an example of a weight-loss weigh feeder system 100 that operates in the presence of internal pressure. The weight-loss weigh feeder system 100 may be installed as part of a contained materials-handling system that can be sealed for dust containment.

As shown in the FIG. 1 example, the system 100 includes a flexible gas purge line 140 that provides gas pressurization of a container (e.g., vessel, hopper, or tank) 110 capable of accommodating product supply. The flexible gas purge line 140 can be located anywhere on an upper portion of the system 100, the container 110, or the lower conical portion 122 of the pressure-compensator 121. The container 110 is affixed to a scale 130. The system 100 includes a metering mechanism 101 that provides discharge of product from the container 110.

The system 100 includes a pressure-compensator 121 that is affixed to the scale. The pressure-compensator 121 operates to minimize or eliminate the effect of internal pressure in the container 110 on the scale 130 during weight sensing operations. For example, when pressure in the container is present, the pressure-compensator 121 operates to equalize internal pressure forces exerted on the scale 130 and thereby minimizes or eliminates inaccurate weighing of product supply in container 110 that can occur otherwise.

A product-supply inlet 102 and a vent connection 106 are provided and allow internal pressure in the container to extend out to fixed surfaces 104, 108 respectively. Fixed surfaces 104, 108 are off the scale. The product-supply inlet 102 is attached to a product-refill mechanism 180 that typically includes an actuator 112 and a product-supply inlet valve 181. A vent shut-off valve 115 and a vent shut-off valve actuator 114 are located adjacent to the pressure-compensator 121. Actuator 114 acts to move valve 115 between an open position and a closed position. The product-refill mechanism 180 and vent valve actuator 114 cooperate together to provide for adding product in the container 110 when the product reaches a low level. For example, in one embodiment, when a certain amount of product needs to be added to refill the container 110, the vent shut-off valve 115 opens to allow venting of gas from the container 110. The actuator 112 then activates, valve 181 opens, and product is added to the container 110 at inlet 102. Once a desired amount of material supply or product is loaded into the container 110, the product-supply inlet valve 181 closes, and then vent shut-off valve 115 closes. Inert or other gas can be added via flexible gas purge line 140 to reestablish purge pressurization of the container 110.

The product-refill mechanism 180 is mounted to a fixed surface 104 and is flexibly connected to the product-supply inlet 102 located on a cover 120 of the container 110 via flexible sleeve 131. The vent valve actuator 114 and vent shut-off valve 115 are mounted to a fixed surface 108. The vent connection 106 can be connected to a dust collection or exhaust system. In one implementation, as shown in the FIG. 1 example, the vent valve actuator 114 is attached to the vent shut-off valve 115. The vent shut-off valve 115 eliminates any potentially adverse effects of a vacuum draw (negative draw) on the container 110 that can be caused by a dust collection system.

The vent connection 106 may be used to extract dust and displaced air from the container 110 when the container 110 is refilled with product through the product-supply inlet 102. As shown in the FIG. 1 example, the vent connection 106 extends through the pressure-compensator 121, which includes a conical lower portion 122 to direct product that may settle out of dust laden displaced air or other gas back into the container 110. In one implementation, the conical lower portion 122 of the pressure-compensator 121 is independently supported off the container 110.

Once pressurization of the container 110 occurs, equal and opposite forces generated by pressure internal to the container 110 act against internal surfaces of the container 110 uniformly. The upward component of force, which acts uniformly across the face of the container cover 120, extends through the product-supply inlet 102 and vent connection 106 onto the fixed surfaces 104, 108. Due to the product-supply inlet 102 and vent connection 106 penetrations in the container cover 120, the surface area of the container cover 120 is not equal to that of the surfaces directly opposite the container cover, e.g., at areas 116, 118. Therefore, the upward component of force acting against the container cover 120 is less than the opposite downward component of force acting on the bottom of container 110.

The pressure-compensator 121 includes an annular compensation ring 124, sized such that the surface area of the ring is identical to the sum of the cross sectional areas of the system's product-supply inlet 102 and vent connection 106. The compensation ring 124 operates to equalize the before-mentioned forces. One advantage of the compensation ring 124 is that it may minimize or negate the adverse effects of internal pressure (positive or negative) from affecting accurate weight sensing and, in turn, system performance. In some implementations, the pressure-compensator 121 is arranged as a pressure-balancing mechanism to ensure accurate weight sensing by scale 130 in the presence of an internal (purge) pressure.

Figure 2:
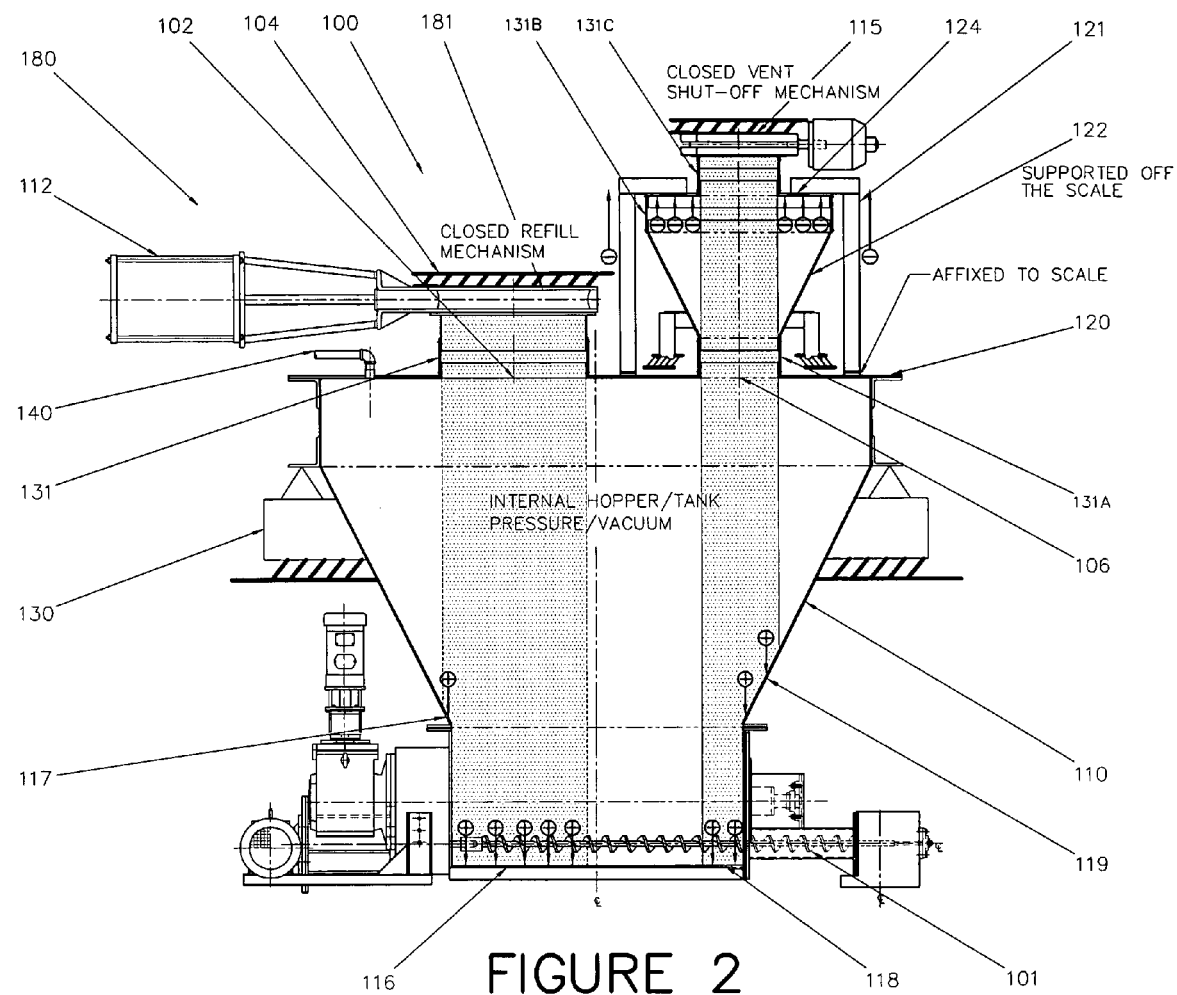
FIG. 2 illustrates an example of pressure forces applied to the weight-loss weigh feeder system of FIG. 1.

FIG. 2 illustrates an example of pressure forces applied to the example weight-loss weigh feeder system of FIG. 1. As explained previously, in one implementation, the pressure-compensator 121 is located in the vent connection 106 and has the conical lower portion 122 that directs the return of accumulated product back into the container 110 (i.e., dust that rises upward) while venting during a product refill operation.

Example forces acting on the weigh feeder system due to pressurization are illustrated as arrows in FIG. 2. Positive forces that add (erroneously) to the weight measurement of product within the container 110 are illustrated with a "+" symbol. Negative forces that subtract from the weight measurement of product are illustrated with a "−" symbol. These negative forces counterbalance the positive forces mentioned previously. Static forces that neither add nor subtract weight have no symbol.

The flexible gas purge line 140 provides purge gas to the interior of the container 110, but itself has no positive or negative influence on the scale 130. Flexible connectors or sleeves 131, 131a, 131b and 131c are provided to allow free movement of the weighing system in response to changes of weight (e.g., material) within the container 110, and are gas impermeable. Thus, the purge gas contained within the container 110 can not escape into the surrounding atmosphere and the flexible sleeves can create an airtight system when valves 181 and 115 are closed. The compensation ring 124 of the pressure-compensator 121 is attached directly to the container cover 120 of the container 110 by elements 121. The compensation ring 124 is exposed to the contents of container 110 and may be attached to any location on the container cover 120. During pressurization, the internal purge pressure imparts an upward force on the compensation ring 124 equal to the downward force on the opposite portions of container 110 at locations 116, 117, 118 and 119. Since the compensation ring 124 is mounted to the container 110 of the system 100 by attachment to cover 120, the upward force on ring 124 is transferred directly to the container 110. The conical lower portion 122 of the pressure-compensator 121 is supported off the scale 130. The compensation ring 124 can continuously negate any adverse effects that pressure (internal to the container) would have upon weight sensing, and system performance.

Other implementations are within the scope of the following claims.

What is claimed is:

1. A weight-loss weigh feeder system comprising:
   a scale;
   a container attached to the scale, the container having at least one material inlet for filling a material supply and at least one flexible gas impermeable connector between the container and the at least one material inlet;

a flexible gas inlet connected to the container;

a metering mechanism, to discharge the material supply from the container; and a vent connection on the container, the vent connection attached to a flexible gas impermeable connector to allow disbursement of displaced gas in the container when a pressurized gas enters the gas inlet, wherein the scale provides a signal indicative of a weight associated with the material supply in the container.

2. The weight-loss weigh feeder system of claim 1 wherein the gas inlet is attached to any location on the container.

3. The weight-loss weigh feeder system of claim 1 comprising a pressure compensator attached to the container, the pressure compensator configured to provide internal pressure compensation in the container when a pressurized gas is present in the container.

4. The weight-loss weigh feeder system of claim 3 wherein the gas inlet is attached to any location on the pressure-compensator.

5. The weight-loss weigh feeder system of claim 3 wherein the pressure compensator is attached to any location on the container which is exposed to the inside of the container.

6. The weight-loss weigh feeder system of claim 3 wherein the pressure compensator comprises an annular ring.

7. The weight-loss weigh feeder system of claim 3 wherein the pressure compensator comprises a lower conical portion to direct product into the container.

8. The weight-loss weigh feeder system of claim 3 wherein the pressure compensator provides accurate weighing of the material supply by the scale when pressurized gas is present in the container.

9. The weight-loss weigh feeder system of claim 1 wherein the at least one material inlet comprises a closable valve, the valve flexibly connected to the container and openable to allow a flow of the material supply to enter the container.

* * * * *